United States Patent [19]
Hermanns

[11] 3,920,235

[45] Nov. 18, 1975

[54] SELF-TIGHTENING QUICK RELEASE CLAMP

[75] Inventor: Jurgen Hermanns, Dunellen, N.J.

[73] Assignee: Burroughs Corporation, Detroit, Mich.

[22] Filed: June 5, 1974

[21] Appl. No.: 476,678

[52] U.S. Cl. .............................. 269/234; 269/238
[51] Int. Cl.² ........................................ B25B 5/04
[58] Field of Search .......... 269/216, 229, 234, 235, 269/237, 238, 239

[56] References Cited
UNITED STATES PATENTS

| 63,929 | 4/1867 | Morse | 269/235 |
| 153,133 | 7/1874 | Van Wagoner | 269/238 |
| 166,553 | 8/1875 | Pollard | 269/234 |
| 1,175,347 | 3/1916 | Dvorsky | 269/234 |
| 2,619,138 | 11/1952 | Marler | 269/238 |
| 3,710,653 | 1/1973 | Miller | 269/237 |

Primary Examiner—Roy Lake
Assistant Examiner—Mark S. Bicks
Attorney, Agent, or Firm—Larry M. Jarvis; William B. Penn; Kevin R. Peterson

[57] ABSTRACT

A quick-release clamping device including two facing L-shaped members having the horizontal leg of one pivoted to the vertical leg of the other to form clamping jaws between the horizontal legs. A ring is wedgingly inserted between the vertical legs to tighten and maintain the clamp. In the preferred embodiment the clamping device, including the ring, is formed from stainless steel for self-tightening of the clamping action when used in processing workpieces under heat.

10 Claims, 3 Drawing Figures

SELF-TIGHTENING QUICK RELEASE CLAMP

BACKGROUND OF THE INVENTION

The invention relates to workholders of the clamping type and more particularly to a workholder clamp of relatively simple construction providing quick engagement and quick releasibility.

Many approaches have been made to solving the need for a quick release workholder of simple construction for clamping sheet-like materials together in planar, juxtaposed relationship. The difficulties increase if the workholder, with the workpieces in clamped position, has to be easily moved from one place to another. The problems are further exacerbated when the clamped workpieces shrink away from the workholder when processed under heat.

For example, in the fabrication of gas display panels, two or more glass plates must be assembled in a stacked relationship and sealed together by glass frits under pressure and heat. Previously it had been necessary to assemble the plates in a jig between two jaw components which are screw or bolt tightened together. This is exemplified in U.S. Pat. No. 3,730,511 issued May 1, 1973 to B. Caras and assigned to the same assignee as the present invention. This patent discloses a clamping device for gas display which operates to secure an assemblage of glass plates between two jaw components using screw or bolt tightening expedients and employing resilient members to supply constant pressure to the plates to compensate for shrinkage as the plates bond together during a heat sealing process.

Such clamps, while operating satisfactorily, are complex in structure contributing to the cost of manufacturing the clamp, and require considerable time for securing the workpiece into position and then releasing it. The discovery of a workholder of relatively simple construction providing quick engagement and quick releasibility is genuinely needed in the assembly of gas display panels.

It is therefore an object of this invention to simplify the construction of a portable workholder for clamping flat workpieces in juxtaposed planar relationship.

It is a further object of this invention to reduce the time required to clamp and then release an assembly of thin, relatively rigid materials.

It is a further and more specific object of this invention to provide a clamp suitably adapted to supply an adequate and proper pressure to the layers of a gas display panel while it undergoes a heating process to seal the panel.

SUMMARY OF THE INVENTION

The objects and purposes of the invention are achieved by a workholder for clamping planar workpieces together comprising two facing L-shaped members having the horizontal leg of one member pivoted to the vertical leg of the other, forming clamping jaws between the horizontal legs. A wedging ring is then inserted between the two vertical legs pivoting one horizontal leg toward the other in quick clamping and releasing relationship. The ring is preferably made from stainless steel, expanding under heat to self-tighten the clamp, during a heating process.

Other objects, features and advantages of the invention will be readily apparent from the following description of the preferred embodiment taken in conjunction with the appended claims, and accompanying drawings in which:

DETAILED DESCRIPTION OF THE PREFERRED EMBODIMENT

Figure 2:
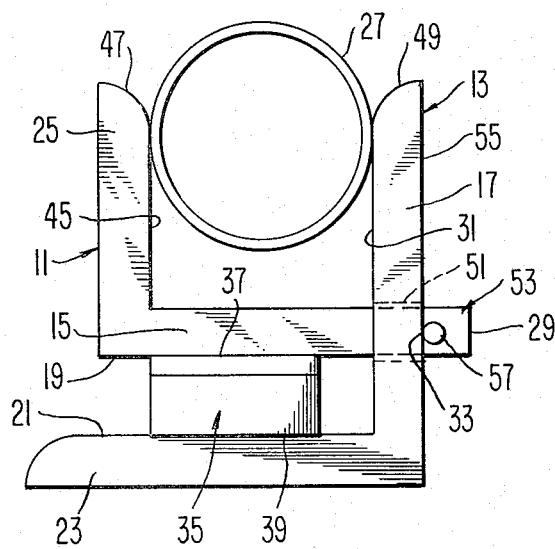
FIG. 2 is a side view of the clamping device of FIG. 1 with the wedging ring in position.
Figure 1:
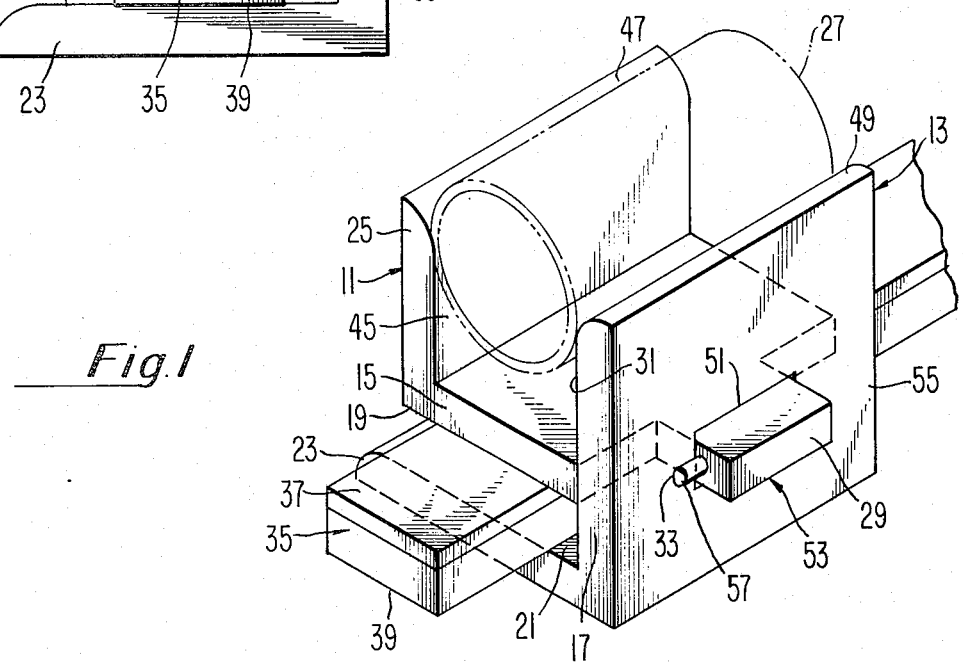
FIG. 1 is a perspective view of the portable clamping device of the invention.

The portable clamp of the invention includes two substantially L-shaped members 11, 13 in opposed relationship, the horizontal leg 15 of member 11 being pivoted to the vertical leg 17 of member 13. Horizontal leg 15 and horizontal leg 23 form clamping jaws having opposed clamping surfaces 19, 21 formed respectively thereon.

The opposed vertical legs 25, 17 of the L-shaped members 11, 13, respectively, have a lever action on the clamping surfaces 19, 21 when the wedging ring 27 is forced between the vertical legs. The vertical leg 25 and the portion of the vertical leg 17 extending beyond the pivot point 33 may be said to constitute lever extensions supplying the lever action on the clamping surfaces 19, 21. The ring 27 is retained in operative position between the lever extensions by friction and is easily and quickly removed to release the clamp.

Horizontal leg 15 of member 11, having clamping jaw surface 19 on its underside has its outer end 29 pivotably connected to the wedging leg 17 of member 13. The pivot point 33 is sufficiently positioned above the horizontal surface of the clamping jaw 23 to space the clamping jaw surfaces 19, 21, when both are horizontal and parallel to each other, at a distance from each other substantially equal to the height of the assembled planar workpiece 35 when under pressure. In other words, when the workpiece assembly 35 is positioned between the clamping jaws 15, 23 and the wedging ring 27 is inserted, pivoting the member 11 with respect to the member 13 into clamping position, the clamping surfaces 19, 21 and the top and bottom surfaces 37, 39 of the workpiece assembly 35 will be substantially parallel, the surface of the clamping jaws being contiguous with the surfaces of the workpiece.

As illustrated, the two L-shaped members 11, 13 are interfitted by means of a receiving aperture 51 positioned in the vertical wedging leg 17 to freely receive the outer end 29 of the horizontal leg 15. The width of the horizontal leg 15 is reduced at its outer end 29 to provide a tab 53 of such length as to extend completely through the aperture. The tab 53 has an elongated opening to receive a pin 57 extending across the back side 55 of the vertical wedging leg 17 when the tab is positioned through aperture 51 in a manner both to keep the horizontal leg 15 from leaving the aperture 51 and to permit the horizontal leg 15 to pivot relative to the wedging leg 17.

Figure 3:
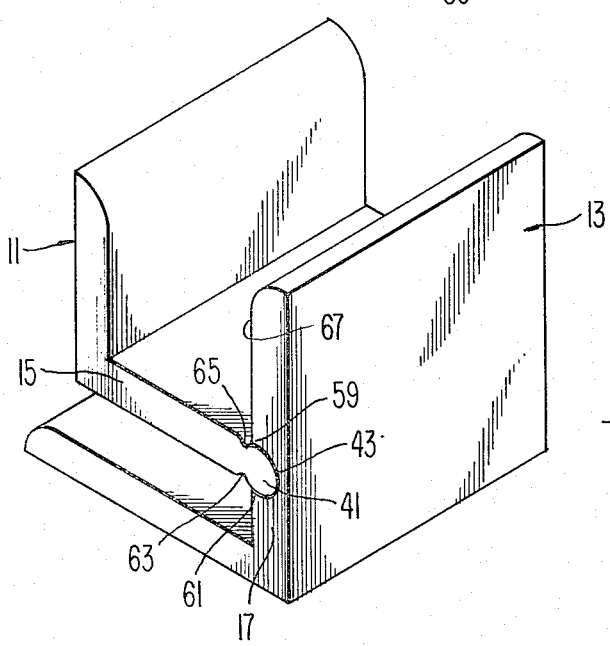
FIG. 3 is a perspective view of a modified clamping device employing a "ball and socket" type pivotal mounting.

Such a pivotal connection is merely exemplary and many other forms of pivotal connecting expedients may be used. For example, FIG. 3 illustrates a ball and socket type connection to facilitate quick and easy assembling of the clamp. The outer end 41 of the clamping jaw 15 is fashioned to provide the "ball." portion of the ball and socket type joint which, as seen, is cylindrical in shape. A socket 43 is formed in the inner side of the vertical leg 17 to contain the cylindrical end 41 of the clamping jaw 15. To assemble the clamp, the cylindrical end 41 is slid edgewise from the side of vertical leg 17 into the socket 43. The contour of the socket 43 is designed to provide two corners 59, 61 at the inner surface 67 of vertical leg 17 to be spaced apart by a distance which is less than the diameter of the "ball" end 41 of the clamping jaw 15 so as to keep the "ball" end 41 from laterally disengaging from its socket 43 as the wedging ring 27 is forced between the two vertical legs 25, 17. Further, the cylindrical end of clamping jaw 15 has a neck portion formed of two recessed portions 63, 65 located on both sides of jaw member 15 and defining the cylindrical end, the neck portion receiving the socket corners 59, 61 during swinging of the clamping jaw 15 relative to vertical leg 17.

It is also foreseeable that a more generalized clamp could have a plurality of apertures or sockets wherein clamping jaw 15 could be engaged for different heights of workpieces.

The wedging ring 27 is constructed with its outer diameter precisely gauged to form an increasingly frictional and force fit relationship with the inner surfaces 45, 31 of the wedging legs 25, 17 as the ring is inserted therebetween. The wedging ring 27 may be fabricated of any convenient material, but preferably of stainless steel, or other material having a high coefficient of thermal expansion.

The stainless steel embodiment of the ring 27 has particular utility when the clamp is used for holding a workpiece under pressure during the application of heat. Any tendency of the workpiece to shrink under heat will be counteracted by the expansion of the ring. The L-shaped members 11, 13 may, of course, also be formed of stainless steel, if desired.

The shoulders 47, 49 of the vertical legs 25, 17 are preferably chamfered or beveled for easy insertion of the ring 27 between the wedging surfaces 45, 31. the height of the vertical leg 25 of the pivoted member 11 will, of course, be properly dimensioned for proper alignment with the other vertical leg 17.

Although the principles of applicant's invention may be utilized in large or elongated clamps (a plurality of rings, for example, could be used), the clamp is particularly useful in a portable embodiment. The clamp, with its positioned workpiece, may be placed in an oven, for example, or otherwise manipulated without difficulty. The simplicity of the construction results in a minimum of weight of the clamp.

Although the preferred embodiment described herein has specific utility with a workpiece having parallel upper and lower surfaces, it is also apparent that the clamping jaws 15, 23 may be curved or contoured as required to fit ohter shapes of workpieces. Further, the clamp of the invention due to its unique construction would operate in an equally efficient and precise manner if mounted on a support or wall with the legs 25, 17 oriented to assume a horizontal direction or a direction other than vertical.

Accordingly, many modifications of the disclosed device will suggest themselves to persons skilled in the art and it is not intended to limit the invention to the form shown but rather to encompass all modifications which fall within the scope of the appended claims.

What is claimed is:

1. A clamping device comprising:
    first and second substantially L-shaped members, one leg of said first member being pivoted to one leg of said second member, a portion of said one leg of said second member extending beyond the pivot point, said one leg of said first member and the other leg of said second member forming clamping jaws having opposed surfaces to receive an article therebetween, and a surface of the other leg of said first member and a surface of said portion of said one leg of said second member being in opposed, substantially parallel, spaced-apart relationship; and
    a separate freely movable wedging member for wedging insertion between and in bodily contact with the substantially parallel opposing surfaces of the other leg of said first member and said portion of said one leg of said second member, said wedging member being in free sliding longitudinal contact with and along the longitudinal dimension of said last named opposing surfaces during insertion for exerting a force therebetween affecting relative pivoting of said one leg of said first member toward said other leg of said second member while maintaining substantially parallel spaced-apart relation.

2. The clamping device of claim 1 adapted for clamping workpieces in a heat-processing environment wherein said wedging member is formed from heat expansible material, said wedging member for expansibly biasing said other leg of said first member apart from said portion of said one leg of said second member when heat is applied to said wedging member.

3. The clamping device of claim 1 wherein one of said legs forming a clamping jaw is pivoted at a predetermined height above other of said clamping jaws for maintaining said clamping jaws substantially parallel to each other during clamping of a workpiece of specific thickness.

4. The clamping device of claim 3 wherein said wedging member is a ring, said ring sized for cooperating with the substantially parallel opposing surfaces of said other leg of said first member and said portion of said one leg of said second member for firmly securing itself therebetween while biasing said last-named legs apart.

5. The clamping device of claim 4 adapted for clamping workpieces in a heat-processing environment wherein said ring is formed from heat expansible material, said ring for expansibly biasing said other leg of said first member apart from said portion of said one leg of said second member when heat is applied to said ring.

6. The clamping device of claim 5 wherein said heat expansible material is stainless steel.

7. A clamping device comprising:
    a pair of clamping jaws, an end of one of said jaws being pivoted to an end of the other jaw;
    a leverage extension on the unpivoted end of said one jaw;
    a leverage extension on the pivoted end of said other jaw;
    said leverage extensions extending away from said jaws in substantially the same direction and each having a surface in opposed, substantially parallel, spaced-apart relation; and
    a separate freely movable wedging member for wedging insertion between and in bodily contact with said substantially parallel opposing surfaces of said leverage extensions, said wedging member being in free sliding longitudinal contact with and along a longitudinal dimension of said last named opposed surfaces during insertion for exerting a force therebetween affecting relative pivoting of said jaws toward each other.

8. The clamping device of claim 7 wherein said other jaw includes a portion for spacing apart the clamping surfaces of said clamping jaws.

9. The clamping device of claim 7 adapted for clamping workpieces in a heat-processing environment wherein said wedging member is formed from heat expansible material, said wedging member for expansibly biasing said leverage extensions apart when heat is applied to said wedging member.

10. The clamping device of claim 7 wherein said wedging member is a ring, said ring sized for cooperating with the substantially parallel opposing surfaces of said leverage extensions for firmly securing itself therebetween while biasing said leverage extensions apart.

* * * * *